May 6, 1930.  A. J. ZVIRBLIS  1,757,894
CURRENT MOTOR
Filed Sept. 27, 1927   3 Sheets-Sheet 1

Antanas Janas Zvirblis
INVENTOR

BY Victor J. Evans
ATTORNEY

WITNESS:

May 6, 1930. A. J. ZVIRBLIS 1,757,894
CURRENT MOTOR
Filed Sept. 27, 1927 3 Sheets-Sheet 3

Antanas Janas Zvirblis
INVENTOR

BY Victor J. Evans
ATTORNEY

WITNESS:

Patented May 6, 1930

1,757,894

UNITED STATES PATENT OFFICE

ANTANAS JANAS ZVIRBLIS, OF BARBERTON, OHIO

CURRENT MOTOR

Application filed September 27, 1927. Serial No. 222,304.

This invention relates to current motors, and its general object is to provide a water actuated motor that is capable of producing power for many purposes, but is especially designed for driving an electric generator.

A further object of the invention is to provide a current motor that can be set up in the current of a stream or the like in an easy and expeditious manner with very little effort and requires very little movement of the water to operate the same.

Another object of the invention is to provide a current motor that is extremely simple in construction, inexpensive to manufacture, and is efficient in operation and service.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which.

Figure 1:
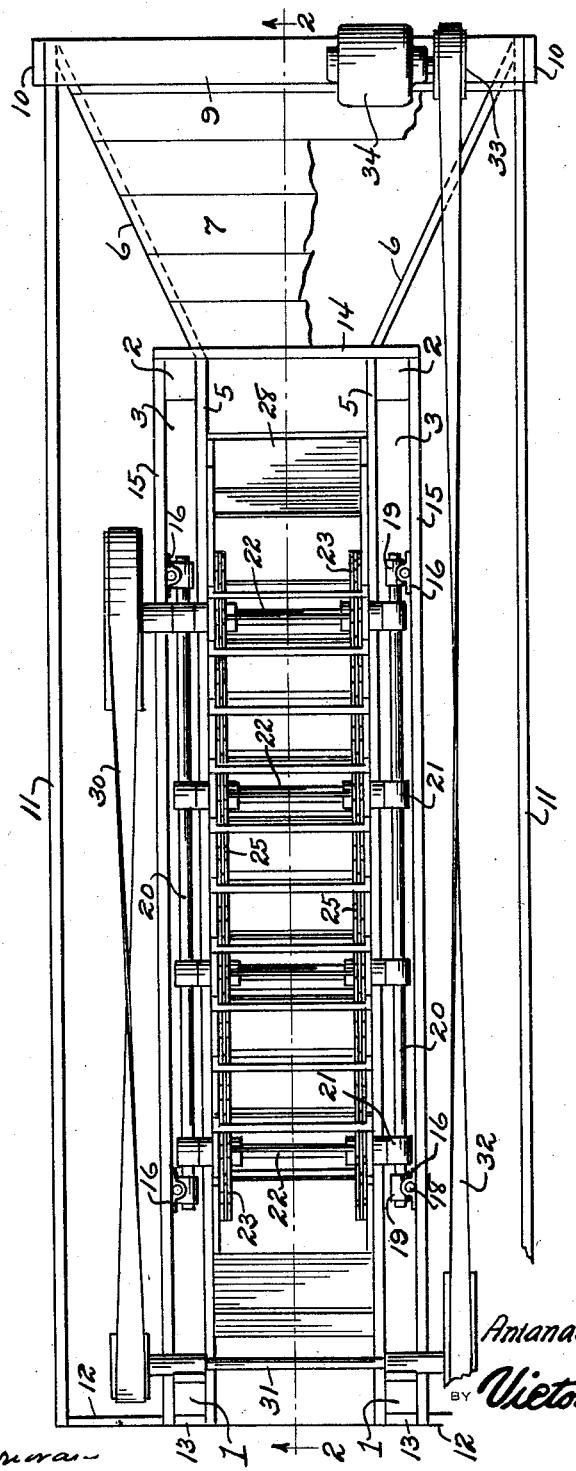
Figure 1 is a top plan view of the apparatus forming the subject matter of the present invention with parts broken away and showing a generator mounted to be operated thereby.

Referring to the drawings in detail, it will be noted that I have shown my apparatus with a generator mounted to be actuated thereby, but I want it understood that the apparatus is capable of operating motors and the like as well as for any other desired purpose.

Figure 3:
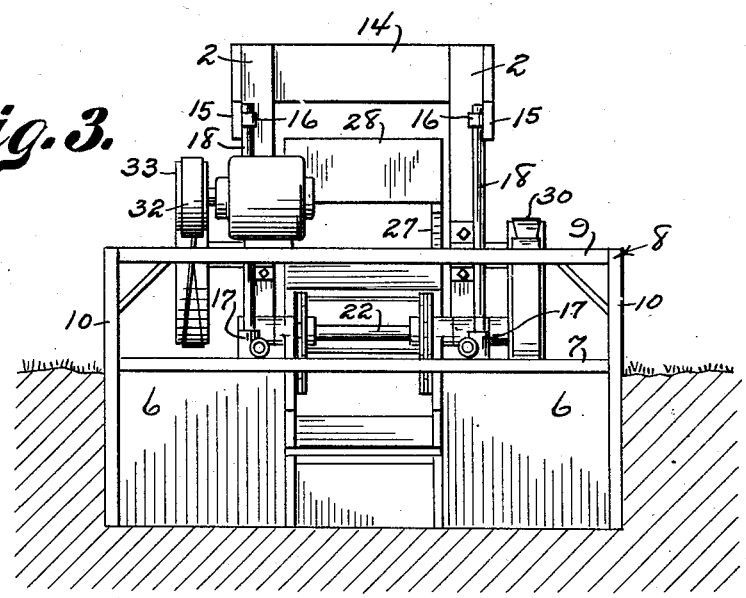
Figure 3 is a front view thereof.
Figure 4:
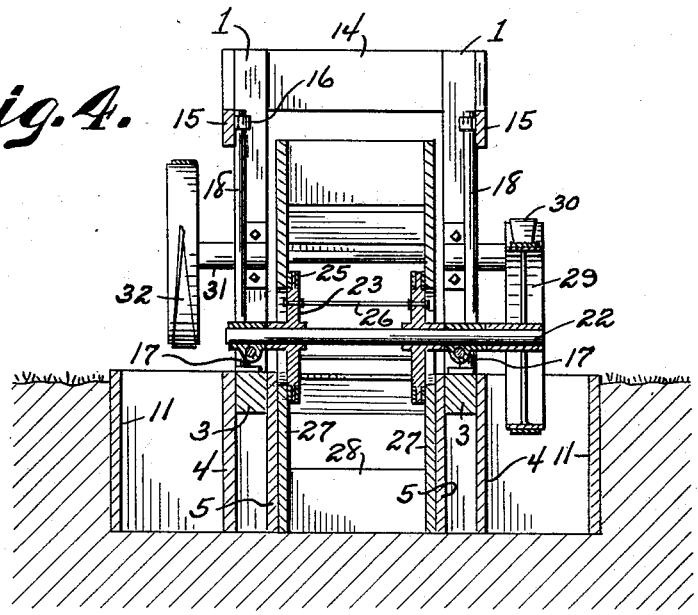
Figure 4 is a sectional view taken on line 4—4 of Figure 2, looking in the direction of the arrows.

The frame to which is mounted the movable parts and supporting means of my motor includes uprights 1 and 2 which are arranged in pairs and suitably secured in the current of a stream or the like. Secured to the uprights a suitable distance above the surface of the water of the stream are longitudinally disposed parallel supporting members 3 which have secured thereto on opposed sides thereof and depending therefrom outer and inner walls indicated respectively by the reference numerals 4 and 5. The walls are likewise secured to the uprights 1 and 2 and extend to the bed of the stream as suggested in Figures 2 and 4 of the drawings. The inner walls 5 provide a sluice way and extending from one of the ends of the inner walls are diverging walls 6 which direct the water to the sluice way as will be apparent upon inspection of Figure 3 of the drawings. Secured to the upper ends of the divergent walls 6 is a platform 7 which is provided with a suitable rail 8 extending from the outer end thereof and including a top piece 9 with depending uprights 10 secured to the top piece.

Secured to and extending from the depending uprights and having their upper edges arranged flush with the upper edges of the outer and inner walls 4 and 5 are walls 11 which terminate with the rear ends of the said walls 4 and 5 as best shown in Figure 1 of the drawings, and secured to the ends of the walls 11 and outer walls 5 are end walls 12, while the space between the walls 4 and 5 at the rear ends thereof are closed by strips 13.

Secured across the top of each pair of the uprights 1 and 2 are cross strips 14, and extending between each strip of each pair and secured to the outer side thereof are longitudinally disposed members 15 which not only support the frame but has arranged and secured in spaced relation thereon and extending from the inner side thereof pairs of brackets 16 for a purpose which will be presently apparent.

Figure 2:
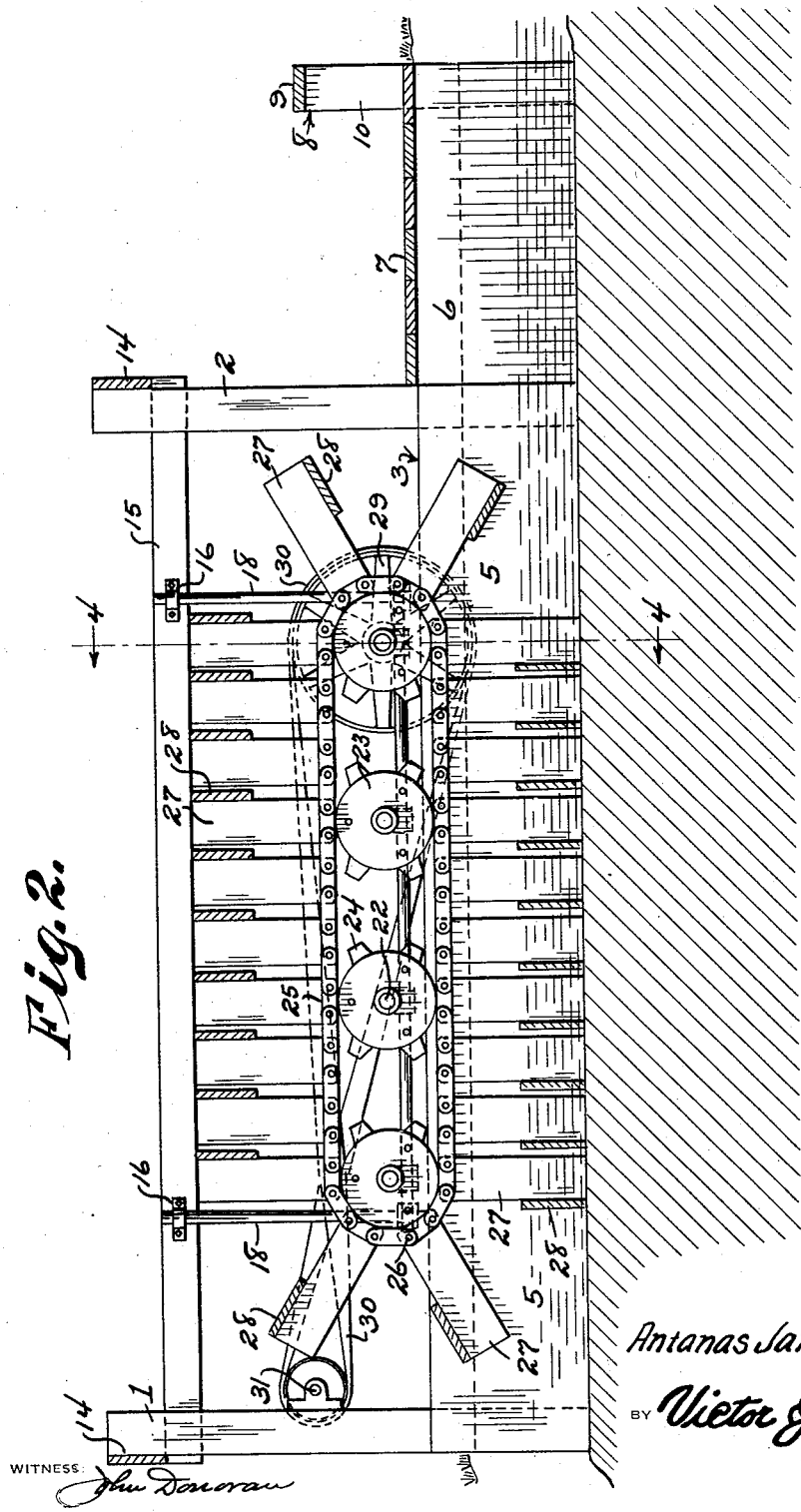
Figure 2 is a sectional view taken approximately on line 2—2 of Figure 1, looking in the direction of the arrows.

Fixed to the supporting members 3 and arranged in alignment with the brackets 16 are sleeves 17 which receive the lower ends of rods 18, while the upper ends of said rods are secured in the brackets, as best shown in Figure 2 of the drawings. Arranged adjacent the lower ends of the rods 18 and secured thereto are sleeve brackets 19 having secured therein horizontally disposed rods 20. The rods 20 have arranged at equi-distantly spaced relation in its length bearings 21 within which are mounted shafts 22.

Each of the shafts have secured thereon in spaced relation with respect to each other a pair of sprockets 23 provided with teeth 24 to receive endless chains 25. Each pair of sprockets are provided with cross rods 26 to properly brace the same and hold them in proper alignment with respect to each other as suggested in Figure 4 of the drawings.

The buckets for the motor each include flat sides 27 which are secured to pairs of pivot pins for the links of the endless chain, and fixed to the sides and at the free end portions thereof are cross members 28. The buckets are arranged for movement through the sluice way in the usual manner, and it will be apparent that the water will act upon the cross members and cause movement of the buckets which will operate the endless chains for moving the sprockets accordingly. One of the end shafts 22 is considerably longer than the remaining shafts and has one of its ends projecting a suitable distance beyond the adjacent bearing thereof to accommodate a pulley 29 which is secured thereto and has trained thereabout a belt 30.

Mounted in suitable bearings secured to the uprights 1 is a shaft 31 having secured to one end a relatively small pulley which receives the belt 30 as shown, while fixed to the opposed end of the shaft 31 is a relatively large pulley to accommodate a belt 32. The belt 32 is trained about a pulley 33 secured to the shaft of a generator 34 as shown. It will be noted from the size of the respective pulleys, that the speed of the generator pulley 33 will be materially faster than the speed of the pulley 29 so that the generator will be operated in a manner to provide current suitable for lighting and work purposes as will be apparent.

From the above description and disclosure of the drawings, it will be obvious that I have provide a current motor, that is extremely simple in construction, and will produce sufficient power to operate a generator as well as for other purposes.

The flat sides of the buckets are so positioned whereas they are disposed in contacting engagement with the inner walls 5 which form the sluice way for the apparatus, and by this construction, none of the water will escape through the sluice way with the result that all of the water passing therethrough will be utilized in operating the apparatus.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A current motor of the character described comprising a frame, uprights included in said frame and being arranged in pairs, spaced walls disposed between said uprights in parallel pairs with one wall of each pair cooperating to provide a sluice way, divergent walls having their adjacent ends in connection with the walls forming the sluice way, a platform supported by said divergent walls, uprights at the remote ends of the divergent walls, a top piece between the last mentioned uprights, outer walls upon opposite sides of the outer wall of the walls first mentioned and extending from the last mentioned uprights in parallelism with the first mentioned walls, longitudinally disposed members extending between the first mentioned uprights, rods depending from said longitudinally disposed members, horizontal rods connecting the depending rods, bearings secured to the horizontal rods, shafts mounted for rotation in said bearings, sprockets arranged in end and intermediate pairs on said shafts and being fixed thereto, endless chains trained about said sprockets, buckets movable through the sluice way and secured to said chains, a pulley secured to one of said shafts, and means driven from said pulley.

In testimony whereof I affix my signature.

ANTANAS JANAS ZVIRBLIS.